(12) United States Patent
Brane et al.

(10) Patent No.: US 6,290,845 B1
(45) Date of Patent: Sep. 18, 2001

(54) WATER SOFTENER TANK

(75) Inventors: Earl Brane, Canal Winchester; Boyd Cornell, Pickerington, both of OH (US)

(73) Assignee: iNetWater LLC, Canal Winchester, OH (US)

( * ) Notice: Subject to any disclaimer, the term of this patent is extended or adjusted under 35 U.S.C. 154(b) by 0 days.

(21) Appl. No.: 09/259,406

(22) Filed: Feb. 26, 1999

(51) Int. Cl.[7] ................................................. C02F 1/42
(52) U.S. Cl. .......................... 210/190; 210/275; 210/284
(58) Field of Search .................................. 210/190, 191, 210/275, 279, 284

(56) References Cited

U.S. PATENT DOCUMENTS

| | | | |
|---|---|---|---|
| D. 332,480 | 1/1993 | Sieren | D23/207 |
| 3,028,963 | 4/1962 | Rose | 210/139 |
| 3,077,989 | 2/1963 | Larkin | 210/98 |
| 3,185,302 | 5/1965 | Kryzer | 210/126 |
| 3,282,426 | 11/1996 | Entringer | 210/96 |
| 3,306,504 | 2/1967 | Tischler | 222/442 |
| 3,335,752 | 8/1967 | Hiers et al. | 137/599.1 |
| 3,891,552 | 6/1975 | Prior et al. | 210/88 |
| 5,022,994 | 6/1991 | Avery et al. | 210/670 |
| 5,089,140 | 2/1992 | Brane, Tucker | 210/678 |
| 5,116,491 | 5/1992 | Brane, Tucker | 210/143 |
| 5,149,437 * | 9/1992 | Wilkinson et al. | 210/284 |
| 5,157,979 | 10/1992 | Brane, Tucker | 74/58 |
| 5,173,179 | 12/1992 | DeVoe et al. | 210/97 |
| 5,300,230 | 4/1994 | Brane et al. | 210/662 |
| 5,378,370 | 1/1995 | Brane et al. | 210/678 |
| 5,389,243 | 2/1995 | Kaplan | 210/90 |
| 5,589,058 | 12/1996 | Bauer | 210/98 |
| 5,650,064 | 7/1997 | Ferrali | 210/97 |
| 5,882,531 * | 3/1999 | Cohen | 210/279 |

* cited by examiner

Primary Examiner—Ivars Cintins
(74) Attorney, Agent, or Firm—Porter, Wright, Morris & Arthur

(57) ABSTRACT

A two-chambered water softener tank with a bi-directional valve for controlling the flow of water between the chamber for use with a water softener is disclosed. The tank includes an outer shell, an upper chamber located within the outer shell containing a redox medium, a lower chamber located within the outer shell and beneath the upper chamber that contains an ion exchange resin, a first port allowing water to flow into the upper chamber, a second port allowing water to flow into the lower chamber, and a third port for allowing water to flow between the upper chamber and lower chamber. The water softener tank also includes a bi-directional valve engageable with the third port for regulating flow of water through the third port from the upper chamber to the lower chamber during service of the water softener and from the lower chamber to the upper chamber during regeneration of the water softener. The bi-directional valve remains open as water flows from the upper chamber to the lower chamber. The bi-directional valve floats upwards to restrict the flow of water through the third port from the lower chamber to the upper chamber during regeneration, thereby creating a high pressure flow of water during the regeneration of the water softener to clean the redox medium, such as KDF.

13 Claims, 3 Drawing Sheets

WATER SOFTENER TANK

BACKGROUND OF THE INVENTION

1. Field of Invention

This invention pertains to the art of methods and apparatuses for softening water, and more specifically to methods and apparatuses for providing a two-chambered water softener tank permitting water to be treated by two separate treatment media and a bi-directional valve that allows pressurized water to flow into one of the tanks during the regeneration cycle of the water softener.

2. Description of the Related Art

In the past, single-chambered tanks that contained a single medium, typically an ion exchange resin, were used to soften water. Many of the past water softener tanks used valves to close liquid paths completely. Water softeners with valves were operated by mechanical equipment or required the support of springs.

U.S. Pat. No. 5,173,179 to DeVoe et al. describes the use of a plurality of liquid treatment containers. Water is cycled through one direction for removal of materials in the water, and then water is cycled in the opposite direction for regeneration of the treatment medium. However, the purifying apparatus is a series of containers which overflow from the first to the second and so on. There is no valve for controlling the back flow of water during the regeneration cycle. This use of overflow containers limits the effectiveness of regeneration of relatively heavy ion exchange resins.

U.S. Pat. No. 5,389,243 to Kaplan discloses a two-chamber water filtering system. Kaplan describes the use of an active pump to pump water from a first chamber through a flow to a second chamber under pressure. Turning off the pump causes a pressurized back flow to regenerate the filter and the apparatus. U.S. Pat. No. 4,3,5992 to Clauer et al. discloses the use of a vacuum operated control valve for delivering back wash regeneration fluid at pressure. The control valve requires active control from a vacuum force. However, active pumps may require additional service.

The present invention contemplates a new and improved two-chambered water softener tank which is simple in design, effective in use, and overcomes the foregoing difficulties and others while providing better and more advantageous overall results.

SUMMARY OF THE INVENTION

In accordance with the present invention, a new and improved water softener tank is provided which contains two chambers and two water treatment media for improved treatment of water. The water softener tank also provides a bi-directional valve for providing pressurized backwash to one of the chambers and treatment media during the regeneration cycle.

According to one aspect of the invention, a water softener tank for use with a water softener is disclosed. The tank includes an outer shell, an upper chamber located within the outer shell containing a redox medium, a lower chamber located within the outer shell and beneath the upper chamber that contains an ion exchange resin, a first port allowing water to flow into the upper chamber, a second port allowing water to flow into the lower chamber, and a third port for allowing water to flow between the upper chamber and lower chamber. The water softener tank also includes a bi-directional valve engageable with the third port for regulating flow of water through the third port from the upper chamber to the lower chamber during service of the water softener and from the lower chamber to the upper chamber during regeneration of the water softener. The bi-directional valve remains open as water flows from the upper chamber to the lower chamber. The bi-directional valve floats upwards to restrict the flow of water through the third port from the lower chamber to the upper chamber during regeneration, thereby creating a high pressure flow of water during the regeneration of the water softener to clean and regenerate the redox medium.

According to another aspect of the invention, a method of softening water using a water softener tank is disclosed which includes the steps of passing water through the first port into the upper chamber, treating the water by reduction with the redox medium, permitting flow of water through the third port and the bi-directional valve to the lower chamber, softening the water by exchanging ions with the ion exchange resin, permitting flow of water through the second port to a distributing valve, and regenerating the redox medium and the ion exchange resin.

According to another aspect of the present invention, a water softener tank for use with a water softener is disclosed which includes an outer shell, an upper chamber located within the outer shell containing a redox medium, a lower chamber located within the outer shell below the upper chamber containing an ion exchange resin, an apparatus for allowing water to flow in and out of the upper chamber, an apparatus for allowing water to flow in and out of the lower chamber, an apparatus for allowing water to flow between the upper chamber and the lower chamber, an apparatus for permitting a flow of water through the third port between the upper chamber and the lower chamber. The water softener tank also includes an apparatus for pressurizing the flow of water from the lower chamber to upper chamber during regeneration of the water softener.

One advantage of the present invention is that water may be treated by two separate treatment media for removing various contaminants from the water supply.

Another advantage of the present invention is that the buoyant bi-directional valve allows the free flow of water from the upper chamber to the lower chamber of the water softener during the service cycle and pressurized flow of water from the lower chamber to the upper chamber during regeneration of the water softener, thereby allowing the heavier redox medium to be thoroughly cleaned and regenerated.

Another advantage of the present invention is that the water softener tank may be used with any new or existing water softener valve or system.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
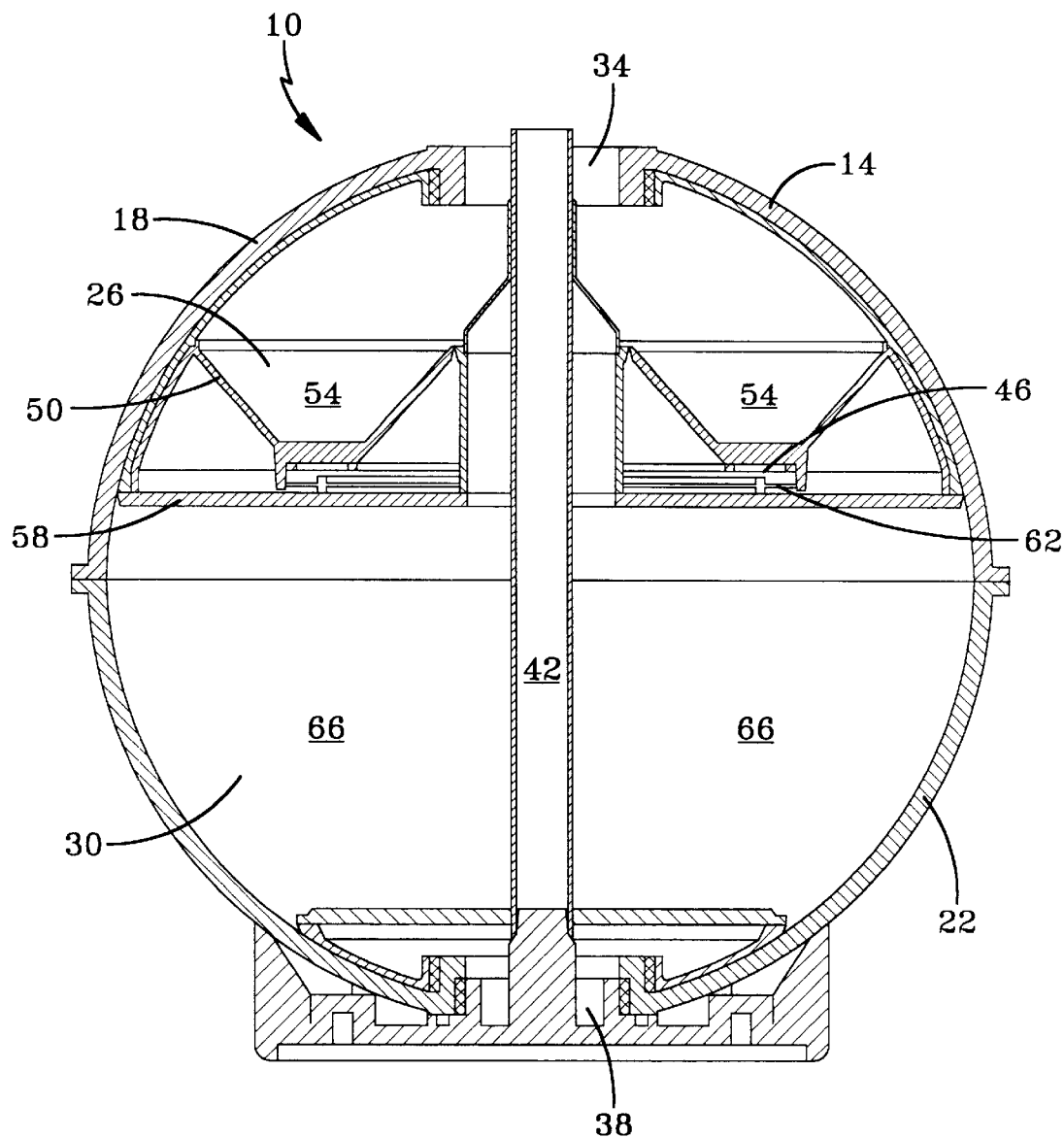
FIG. 1 is a cross-sectional perspective view of a water softener tank.

Referring now to the drawings wherein the showings are for purposes of illustrating a preferred embodiment of the invention only and not for purposes of limiting the same, FIG. 1 shows a cross-sectional perspective view of a tank 10 for use as part of a conventional water softener. The tank 10 includes an outer shell 14. The outer shell 14, in the preferred embodiment, includes an upper hemispherical portion 18 and a lower hemispherical portion 22 that are separate pieces that are sealingly engaged with one another. In a preferred embodiment, the upper hemispherical portion 18 and the lower hemispherical portion 22 are welded together; however, any other suitable means for connecting the upper and lower hemispherical portions 18,22 may be used, such as clamping them together or using a mechanical means for holding the two hemispherical portions 18, 22 in a tightly engaged fit.

Within the outer shell 14, the tank 10 has an upper chamber 26, a lower chamber 30, a first port 34 allowing hard water to flow from a water source into the upper chamber 26 of the tank 10, a second port 3 8 allowing water to flow from the lower chamber 30 out of the tank 10 through channel 42, and a third port 46 allowing water to flow between the upper chamber 26 and the lower chamber 30.

Figure 2:
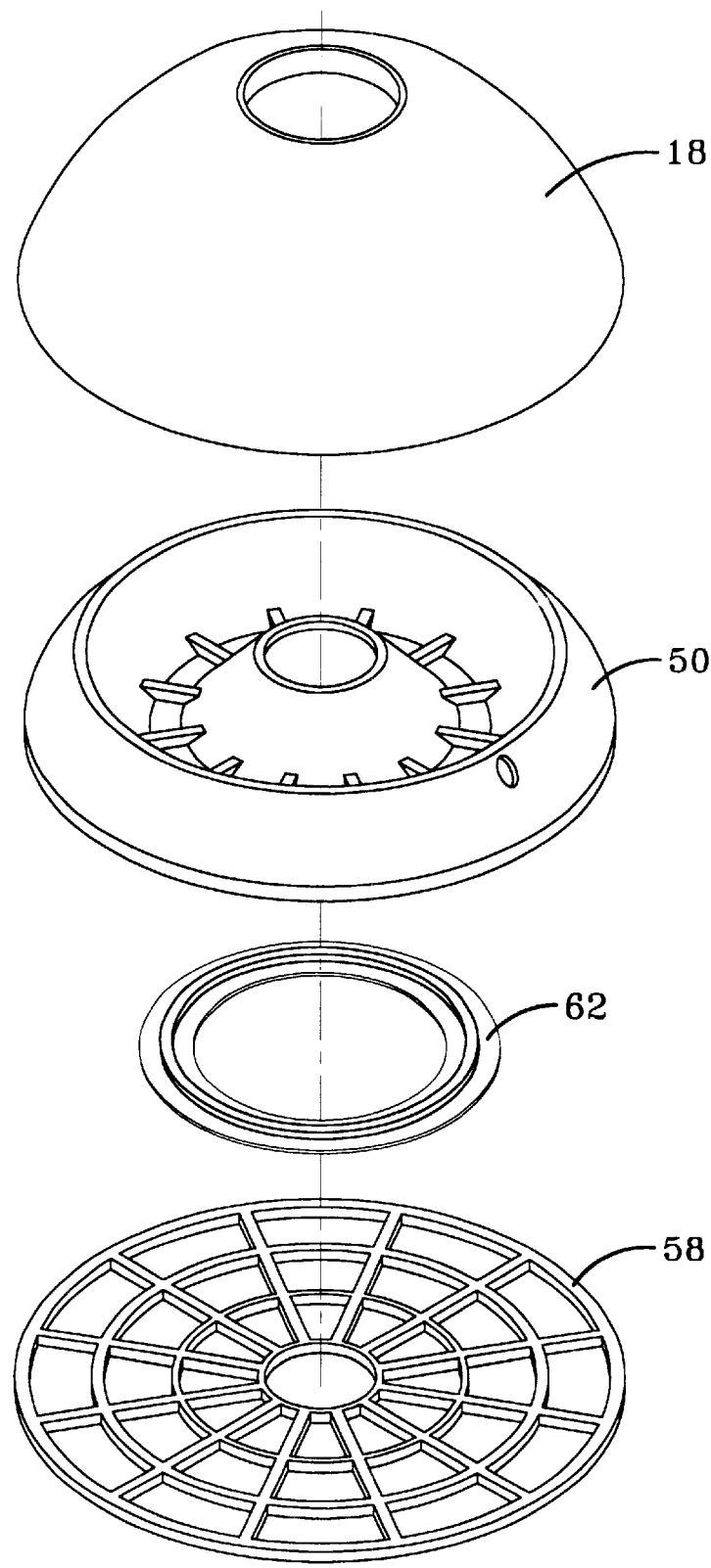
FIG. 2 is an exploded view of the upper chamber of the water softener tank of FIG. 1; and, FIG. 3 is a cross-sectional view of the bi-directional valve during the regeneration cycle of the water softener.

The upper chamber 26 has a basin 50 that contains a redox medium 54. The third port 46 is preferably located at the bottom of the basin 50. With continuing reference to FIG. 1, FIG. 2 shows an exploded view of the upper chamber 26. The upper chamber is covered by the upper hemispherical portion 18. The basin 50 is preferably circular in shape with a V-shape when viewed from a cross-section, as illustrated in FIG. 1. The third port 46 is preferably circular in shape and is one continuous circular opening in the bottom of the basin 50. A mesh screen (not shown) preferably covers the third port 46 to prevent the redox medium 54 from passing through the third port 46. The basin 50 sits on top of a support structure 58 which marks the barrier between the upper chamber 26 and lower chamber 30.

A bi-directional valve 62 controls the flow of water between the upper chamber 26 and lower chamber 30. The bi-directional valve 62 is preferably located between the bottom of the basin 50 and the support structure 58. Water flowing from the upper chamber 26 through the third port 46 forces the bi-directional valve 62 to open fully. During normal service of the water softener, water flows into the tank 10 through first port 34 and mixes with the redox medium 54 in the upper chamber 26. In the preferred embodiment, the redox medium 54 is KDF. While in the preferred embodiment the redox medium is KDF, any copper-zinc redox medium may be used, or any redox medium capable of removing lead, chlorine, and iron from water may be used. Further, it may also be preferable to use a redox medium that removes sulfur from the water. The water then flows through the third port 46 into the lower chamber 26 where it is further softened by an ion exchange resin 66. The water then flows through the second port 38 and up through the channel 42 into the residence.

Figure 3:
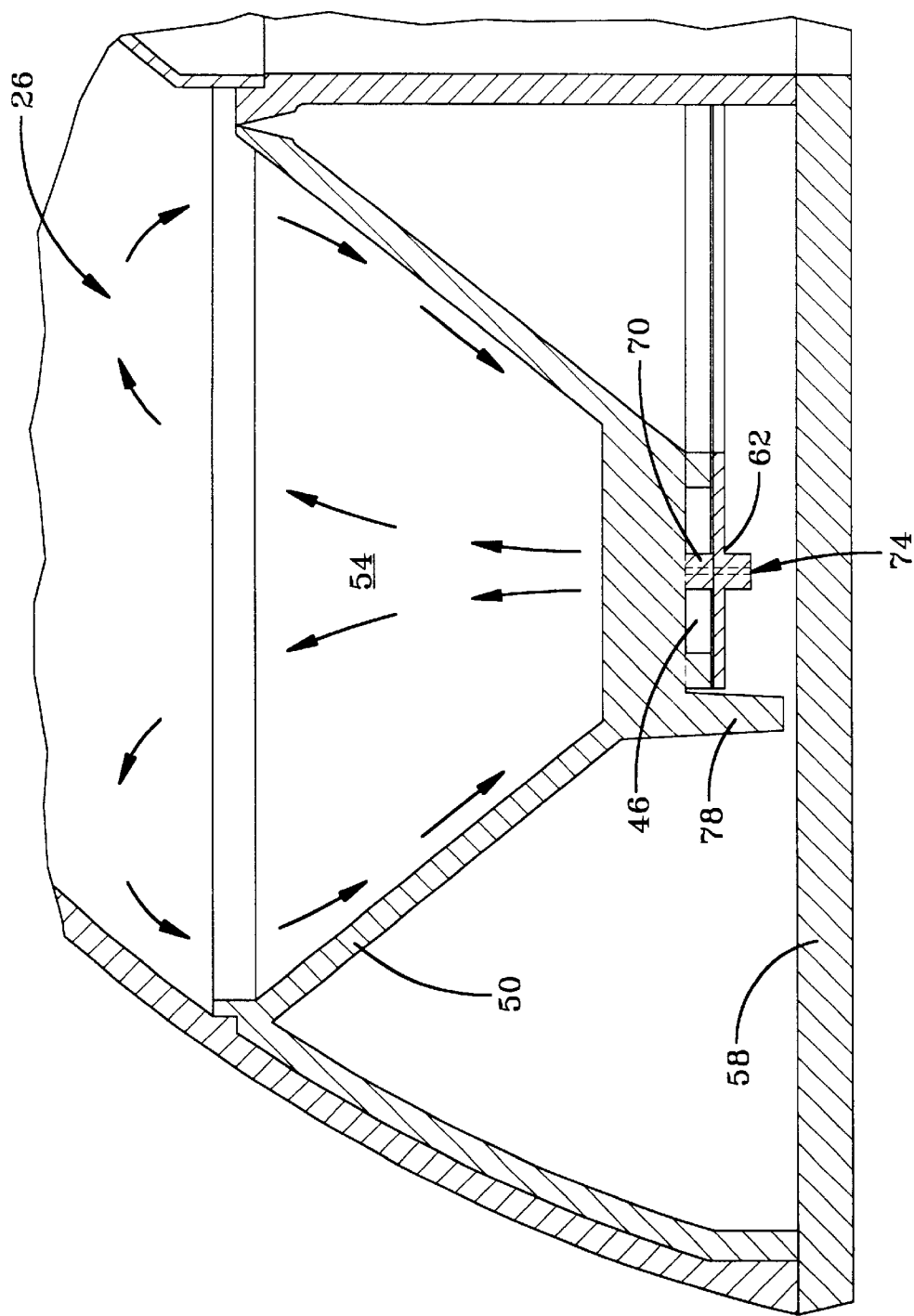

On occasion, the treatment media 54,66 need to be regenerated. During regeneration, a backwash flow of raw water flows through channel 42 through the second port 38 into the lower chamber 30. As the lower chamber 30 fills with water, the water begins to flow through the third port 46 into the upper chamber 26. The redox medium 54 in the upper chamber 26 is typically heavy and requires pressurized water to clean and regenerate it. To that end, the bi-directional valve 62 contains a buoyant material which floats upwards as water flows from the lower chamber 30 to the upper chamber 26. Preferable, the buoyant material is either polyethylene or polypropylene, although any buoyant material that is durable and chemically safe may be used. The bi-directional valve 62 has a valve member 70 that partially obstructs the third port 46, as shown in FIG. 3. In a preferred embodiment of the invention, the valve member 70 has narrow channels 74 cut therethrough at intermittent locations. The bi-directional valve 62 contacts the basin 50, thereby closing the third port 46 with the exception of the channels 74, during regeneration of the water softener. By partially obstructing the third port 46, water flowing from the lower chamber 30 to the upper chamber 26 becomes pressurized as it is forced through the channels 74 in a manner represented by the arrows. The pressurized flow of water is then capable of thoroughly mixing the heavier redox medium 54 in the upper chamber 26. The water then flows out the first port 34 to a drain (not shown). The V-shape of the basin 50 assures that the redox medium 54 comes to a rest at the bottom of the upper chamber 26 over top of the third port 46. The bi-directional valve 62 is circular in shape and is prevented from shifting in such a manner so as to not cover the third port 46 during regeneration by an extension 78 extending below the basin 50 to the support structure 58.

After the initial backwash cycle, a brine solution from a brine storage tank (not shown) flows through channel 42 through the second port 38 into the lower chamber 30 the brine solution exchanges sodium ions for calcium ions located in the ion exchange resin 66. The brine solution fills the lower chamber 30, and then begins to flow through the third port 46 and the bi-directional valve 62 through to the upper chamber 26 in the pressurized manner described above, further cleaning and regenerating the redox medium 54. After the brine cycle, a second backwash cycle occurs that is identical to the previous backwash cycle to complete the regeneration process.

The tank 10 is preferably spherical in shape to promote the flow of water and the settling of the redox medium 54 toward the third port 46 in the upper chamber 26 and the flow of water and the ion exchange resin 66 toward the second port 38 in the lower chamber 30.

The control of water through the water softener in the service and regeneration cycles is controlled by a valve (not shown). Water softener valves are well-known in the art, and one skilled in the art of water softeners would be capable of assembling the tank 10 described above with a known water softener valve, such as the type of valve found in U.S. Pat. No. 3,208,476 to Clack or U.S. Pat. No. 3,225,789 to Thompson, which are hereby incorporated by reference.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A water softener tank for use with a water softener, said tank comprising:
   an outer shell;
   an upper chamber located within said outer shell, said upper chamber containing a redox medium for treating water;
   a lower chamber located within said outer shell, said lower chamber located beneath said upper chamber, said lower chamber containing an ion exchange resin for softening water;

a first port for allowing water to flow into and out of said upper chamber;

a second port for allowing water to flow into and out of said lower chamber;

a third port for allowing water to flow between said upper chamber and said lower chamber; and, a bi-directional valve engageably with said third port for regulating flow of water through said third port from said upper chamber to said lower chamber during service of said water softener and from said lower chamber to said upper chamber during regeneration of said water softener, said bi-directional valve being buoyant in water, said bi-directional valve remaining open as water flows from said upper chamber to said lower chamber, said bi-directional valve floating upward to restrict flow of water through said third port from said lower chamber to said upper chamber, thereby creating a high pressure flow of water during regeneration of said water softener to clean and regenerate said redox medium.

2. The water softener tank of claim 1 wherein said outer shell has an upper hemisphere and a lower hemisphere, said upper and lower hemispheres being sealingly engaged.

3. The water softener tank of claim 2 wherein said outer shell is substantially spherically shaped when said upper and lower hemispheres are sealingly engaged.

4. The water softener tank of claim 3 wherein said upper and lower hemispheres are welded together.

5. The water softener tank of claim 1 wherein said bi-directional valve comprises:

a valve member engageable with said third port, said valve member being displaced from said third port as water flows from said upper chamber to said lower chamber; and, a buoyant member operatively connected to said valve member, said buoyant member raising said valve member and engaging said valve member with said third port as water flows from said lower chamber to said upper chamber during regeneration of said water softener, said valve member partially closing said third port as water flows through from said lower chamber to said upper chamber through said third port, thereby increasing pressure of said water flowing through said third port.

6. A water softener tank for use with a water softener, said tank comprising:

an outer shell;

an upper chamber located within said outer shell, said upper chamber containing a redox medium for treating water;

a lower chamber located within said outer shell, said lower chamber located beneath said upper chamber, said lower chamber containing an ion exchange resin for softening water;

means for allowing water to flow into and out of said upper chamber;

means for allowing water to flow into and out of said lower chamber;

means for allowing water to flow between said upper chamber and said lower chamber; and a bi-directional valve for regulating flow water between said upper chamber to said lower chamber during service of said water softener and from said lower chamber to said upper chamber during regeneration of said water softener, said bi-directional valve having a valve member adapted to pressurize the flow of water from said lower chamber to said upper chamber during regeneration of said water softener.

7. The water softener tank of claim 6, wherein said valve member is adapted to engage a port between said lower chamber and said upper chamber as water flows from said lower chamber to said upper chamber during regeneration of said water softener and to partially close said port as water flows from said lower chamber to said upper chamber through said port, thereby increasing pressure of said water flowing through said port.

8. The water softener of claim 7, wherein said valve element is buoyant such that the valve element rises to engage the port as water flows from said lower chamber to said upper chamber during regeneration of said water softener.

9. A water softener tank for use with a water softener, said tank comprising:

an outer shell having an upper hemisphere and a lower hemisphere, said upper and lower hemispheres being sealingly engaged;

an upper chamber located within said outer shell, said upper chamber containing a redox medium for treating water;

a lower chamber located within said outer shell, said lower chamber located beneath said upper chamber, said lower chamber containing an ion exchange resin for treating water;

means for allowing water to flow into and out of said upper chamber;

means for allowing water to flow into and out of said lower chamber;

means for allowing water to flow between said upper chamber and said lower chamber; and a bi-directional valve for pressurizing flow of water from the lower chamber to the upper chamber during regeneration.

10. The water softener tank of claim 9 wherein said outer shell is substantially spherically shaped when said upper and lower hemispheres are sealingly engaged.

11. The water softener tank of claim 10 wherein said upper and lower hemispheres are welded together.

12. The water softener tank of claim 9 wherein said bi-directional valve includes a valve member engagable with a port allowing water to flow between said upper chamber and said lower chamber, said valve member being displaced from said port as water flows from said upper chamber to said lower chamber, and a buoyant member operatively connected to said valve member, said buoyant member raising said valve member and engaging said valve member with said port as water flows from said lower chamber to said upper chamber during regeneration of said water softener, said valve member partially closing said port as water flows through from said lower chamber to said upper chamber through said port, thereby increasing pressure of said water flowing through said port.

13. The water softener tank of claim 12 wherein said valve member has a channel therethrough allowing water to flow from said lower chamber to said upper chamber when said valve member is engaged with said port.

* * * * *